United States Patent

[11] 3,568,158

[72] Inventors Neil M. Haller
West Chicago;
Frank S. Vigilante, Naperville, Ill.

[21] Appl. No. 695,397
[22] Filed Jan. 3, 1968
[45] Patented Mar. 2, 1971
[73] Assignee Bell Telephone Laboratories, Incorporated
Murray Hill, N.J.

[54] PROGRAM AND SUBROUTINE DATA STORAGE AND RETRIEVAL EQUIPMENT
20 Claims, 12 Drawing Figs.

[52] U.S. Cl. .......... 340/172.5
[51] Int. Cl. .......... G06f 9/00
[50] Field of Search .......... 340/172.5

[56] References Cited

UNITED STATES PATENTS 3,351,919 11/1967 Milford .......... 340/172.5
3,351,909 11/1967 Hummel .......... 340/172.5

OTHER REFERENCES

IBM 7094 Data Processing System Reference Manual - Oct. 21, 1966 Form No. A22-6703

*Primary Examiner*—Paul J. Henon
*Assistant Examiner*—Mark Edward Nusbaum
*Attorneys*—R. J. Guenther and James Warren Falk

ABSTRACT: An electronic program controlled telephone system is disclosed having a call processor for controlling the establishment of call connections among lines, trunks and service circuits via a switching network. The call processor comprises a program control which receives program instructions from a program store to control the establishment of call connections. A call store is included in the processor for storing call data under control of the program control and an input-output control circuit.

INVENTORS: N.M. HALLER
F.S. VIGILANTE
BY Frederick W. Padden
ATTORNEY

PROGRAM AND SUBROUTINE DATA STORAGE AND RETRIEVAL EQUIPMENT

BACKGROUND OF THE INVENTION

1. Field of the Invention

The invention is concerned with the orderly storage and retrieval of data in a program controlled data processing system. Our invention further relates to equipment for controlling the storage of data upon the interruption of a main program to execute one or a series of program subroutines and subsequently the retrieval of the stored data upon the completion of subroutine operations.

2. Description of the Prior Art

The prior art has heretofore extensively used subroutine techniques to achieve coding economies in the programming of data processor work operations. A subroutine is essentially a standardized sequence of coded instructions for performing a specific, well-defined operation during a basic, or main, system program. It is generally advantageous to utilize such a subroutine for implementing mathematical and logic operations which are repeated frequently in a long list of program instructions. The use of subroutines achieves coding economies by virtually eliminating the need for repeating standardized instructions at many different stages of a basic system program. It also reduces the amount of bulk memory apparatus and space required for storing the program instructions. In addition, program debugging is simplified because a subroutine need only be debugged once.

A data processor generally executes each instruction of a basic system program successively until a subroutine is dictated. At that point, the system program is temporarily interrupted and control over the processor is transferred to the subroutine. Prior to the transfer, certain data associated with the system program is reserved and stored for further use following the subroutine operations. Such data usually includes that which is not changed or manipulated by subroutine instructions.

It has been a recognized problem in the prior art to provide facilities for simply and economically controlling both the storage of data upon the interruption of a system program to execute one or more subroutines and the retrieval of such stored data following subroutine operations. In many situations, a substantial amount of equipment had to be provided for the storage and retrieval of both system program and subroutine data. Such arrangements have proven to be complex, costly and burdensome for the orderly organization, storage and retrieval of data.

It is therefore an object of the present invention to provide simple and economical facilities for the orderly storage and retrieval of data for both system program and subroutine operations.

SUMMARY OF THE INVENTION

In accordance with a specific illustrative embodiment of the present invention, a program controlled telephone switching system is advantageously equipped with facilities to control the orderly storage and retrieval of main program and subroutine data for the processing of calls. The facilities include a call processor which is a common control device employed to implement the various telephone administrative and maintenance functions of the switching system. A program control circuit is furnished in the processor for executing program and subroutine instructions. The control circuit receives the instructions from a program store and sequentially executes each such instruction of a basic system program until it is interrupted and control over system operations is transferred to a subroutine.

At the time that such an interrupt occurs, the program control circuit contains system program data in its registers and counters which is generally not changed or manipulated during the subroutine, but which is needed upon the retransfer of system control to the main program. According to the exemplary embodiment of the present invention, the system program data is transferred from the latter registers and counters to a plurality of word storage blocks in a semipermanent call store memory and the registers and counters are advantageously made available for executing subroutine instructions. Illustratively, the call store comprises 16 different blocks each of which contains 8 data words. Each such block becomes uniquely assigned to an individual subroutine when control is to be transferred to that subroutine. Thus, each block is reserved for an individual one of 16 different selectable subroutines in the many subroutines stored in the program store and each word in that block is uniquely reserved for storing the data contents of an individual register or counter of the program control prior to the entry into the associated subroutine. The 16 blocks are utilized for enabling the program control circuit to execute successively a series of 16 different subroutines and to nest, or store, 128 words of data for the registers and counters of the program control circuit. Thus, each block stores 8 different words of data for each of 16 subroutines.

The illustrative embodiment of the present invention advantageously utilizes simple instruction, or command, formats for operating control circuitry in the program control to implement the data storage in the call store word blocks. Four basic commands effect: (1) the transfer of system control to a subroutine from a main program or another subroutine, (2) the holding or transfer of data for storage in the word blocks, (3) the getting or retrieval of the stored data, and (4) the return of system control from the subroutine to the main program or a prior partially executed subroutine. Initially, the control circuitry compiles a portion of a 7-bit address for each of the words in the call store by means of a 4-bit hold-get counter which uniquely defines or identifies each of the 16 blocks in the call store. The counter defines the appropriate address for the word blocks in the call store by being decremented and incremented upon respective entries and returns from subroutine operations. A remaining 3-bit portion of the address is selectively supplied by "transfer", "hold" and "get" commands from the program store. Thus, the 7-bit address identifies the 128 different words in the 16 call store blocks.

The call store is an erasable or destructive readout arrangement which is read at each addressed word initially to erase information prior to the writing of program control data therein for storage during subroutine operations. The read-write sequencing is subsequently used for retrieving stored data for the program control following a subroutine operation.

A transfer from the main system program to a subroutine is initiated by the program control in response to a "transfer and save address" command from the program store. The command causes the present address of the system program to be saved for use in returning system control to that program after the subroutine operations. This "present" address is referred to hereinafter as a return address which is transferred from the program control and is saved by storing it illustratively in a first word of a first one of the 16 blocks in the call store which is associated with a first subroutine. Subsequently, a series of "hold" commands which are part of the subroutine instructions from the program store are executed for transferring data from the program control registers and counters to other words of the first block in the call store for storage. Advantageously, the number of "hold" commands embodied by the programmer into the subroutine determines a variable number of registers and counters from which data is transferred to data words in call store blocks. The remaining subroutine instructions from the program store are then executed by the program control. Thereafter, the foregoing commands are selectively repeated for illustratively executing a series of a maximum of 15 additional subroutines and effecting the storage of program control data in the remaining word blocks of the call store.

Following a subroutine operation, a series of "get" commands from the program store are selectively executed for successively retrieving the stored data from words of the call store blocks and inserting it into the program control registers and counters preparatory to the return into a prior subroutine or the main program. Accordingly, the number of "get" commands in a subroutine determines the number of data words from which data is transferred back to registers and counters of the program control. Next, the program store executes a command which transfers system control from the subroutine to the return address of the main program or prior subroutine which is saved in the call store.

Accordingly, it is a feature of our invention that in the execution of a program, which may be a main or interrupt program or a subroutine, a hold-get counter is utilized for selecting and assigning a block of temporary memory prior to an interruption of that program and a transfer of system control to a next subroutine. Upon such a transfer and in accordance with other features of our invention, "hold" commands of each such next subroutine selectively clear only those call processing registers which are specified by the particular functions to be performed by that subroutine. Thus, a variable number of selectively different ones of the call processing registers are clearable during the execution of each different subroutine. The hold-get counter and "hold" commands cooperate to effect the transfer and storage of the cleared data in the priorly selected and assigned blocks of temporary memory. According to aspects of our invention, therefore, the call processing registers whose data contents are utilizable for executing the aforementioned next subroutine are selectively not cleared and the data contents thereof are selectively readable and manipulatable during the execution of the latter subroutine. As a result, the illustrative structure of our invention enables the subroutine programming to specify those of the latter registers whose data contents it is not necessary to retain in temporary memory for utilization upon a return to a prior program. In addition, it enables the data contents in certain of the noncleared registers to be read but not written over in the execution of subroutine instructions.

Another feature of our invention is that upon the completion of a subroutine operation and before a return of system control to a prior program, the hold-get counter cooperates with subroutine "get " commands to effect the selective retrieval of retained data from selected data words in an assigned block of temporary memory. The retrieved data is returned to the register from which it priorly was cleared. Advantageously, it is another feature of our invention that the hold-get counter cooperates with a transfer command to retrieve a return address of a prior program for returning system control to that program.

BRIEF DESCRIPTION OF THE DRAWING

The foregoing and other objects, features and advantages of this invention will be more fully understood from a reading of the following description of an exemplary embodiment thereof as shown in the drawing in which.

Figures 1, 12:
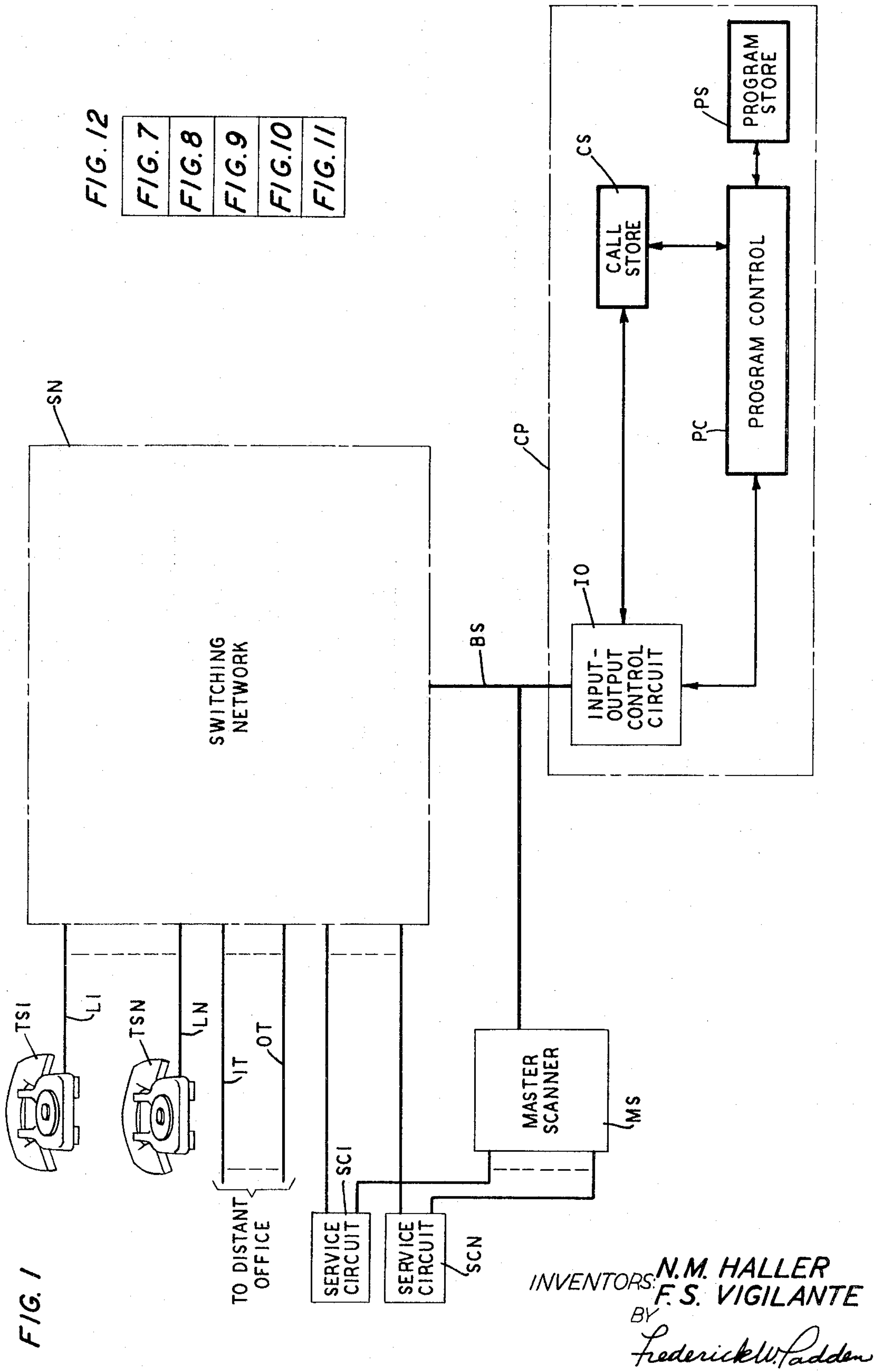
FIG. 1 is a general block diagram of a program controlled communication switching system in accordance with an illustrative embodiment of our invention.
FIG. 12 illustrates the cooperative arrangement of FIGS. 7 through 11.

The equipment illustrative of the principles of our invention is disclosed as incorporated, by way of example, in an electronic program-controlled telephone system. It is particularly concerned with the program control circuit PC, call store CS and program store PS depicted in heavy-lined blocks in FIG. 1. The other equipment elements are neither shown nor described in detail herein, except where necessary for a complete understanding of the invention. The command translator CTR of FIG. 2 may be similar in design and operation to the Buffer Order Word Decoder described in the Bell System Technical Journal, XLIII, Sept. 1964, Number 5, Part 1, pages 1845 et seq.

Although the symbolic representations of circuits in FIGS. 7—11 of the drawings are well-known in the art, a brief description of certain circuits is presented for the purpose of clarity. In the drawings, gates, registers and counters are shown in symbolic form in FIGS. 7—11 because each one is well-known in the art. For this reason, the description of the various circuits will be of a general nature and only those details needed for a complete understanding of the invention are described.

Figure 7:
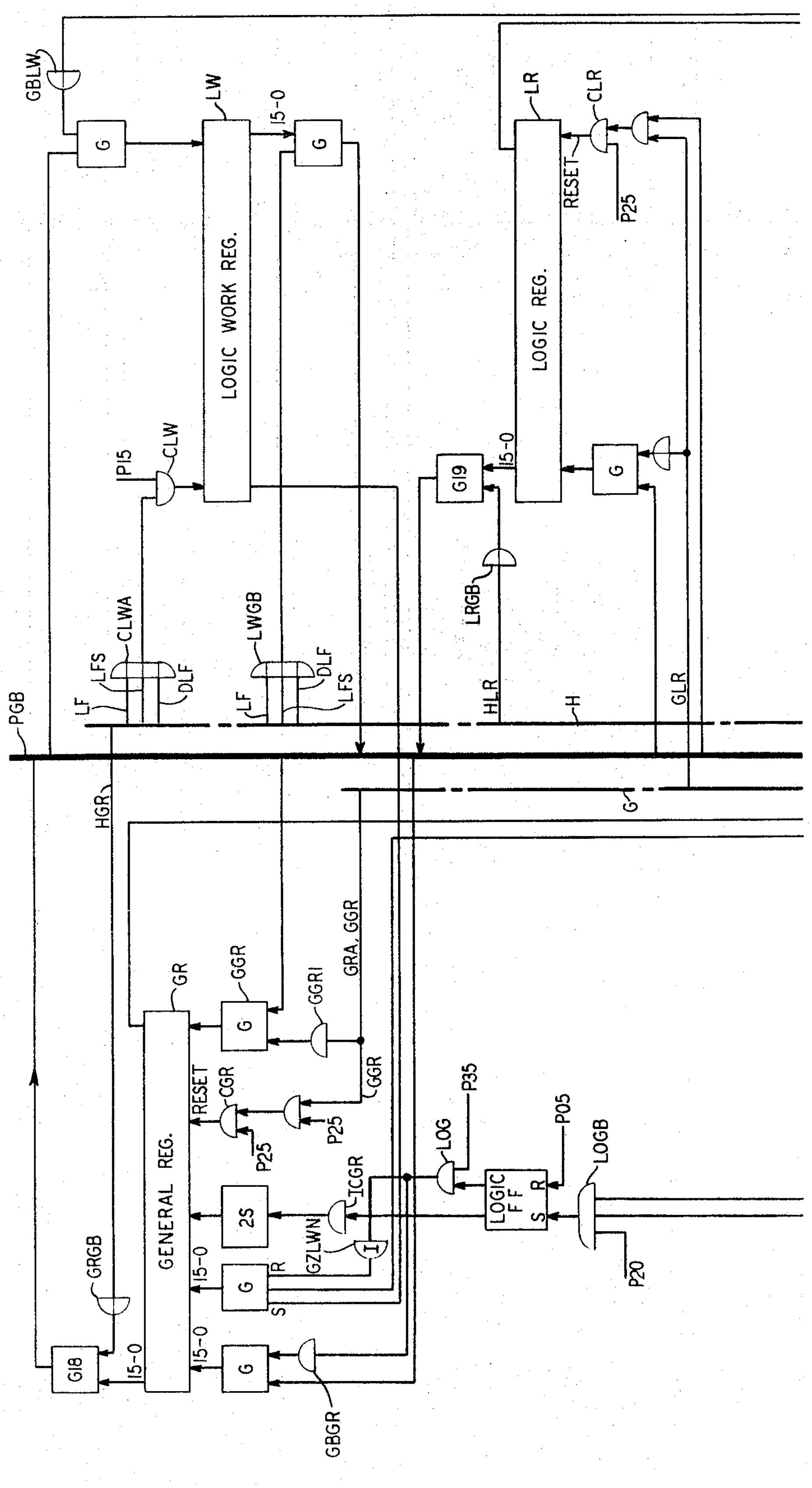
FIGS. 7 through 11 are schematic block diagrams of the program control circuit according to a specific illustrative embodiment of our invention.

The symbol for each of the AND gates used in the circuitry of FIGS. 7 to 11 is a closed crescent with leads terminated at its periphery. Each of these gates, for example gate CGR of FIG. 7, is a coincidence type gate which functions to receive positive and ground potential signals over a number of input leads, which are terminated at the flat side of the crescent, and to pass representative signals to the output lead extending from the arc side of the crescent. When positive potentials are applied to all of the input leads to an AND gate, or when positive potential is applied to at least one of them, the gate is in the disabled (inhibited) condition and ground potential is passed to its output lead. If ground potentials are applied to all input leads, the coincidence of these potentials enables the gate and causes positive potential to be passed to the gate output lead.

The closed crescents with leads extending into the crescents are the symbols used in FIGS. 7 to 11 to represent OR gate circuits. Each of these gates, such as gate CLWA of FIG. 7, is designed to apply ground potential to the output lead extending to the arc side of the crescent to indicate the enabled condition of the gate whenever positive potential is applied to any one of the input leads on the flat side of the crescent. Positive potential is passed to the gate output lead to indicate the disabled (inhibited) condition of the gate whenever ground potentials are applied to all of the gate input leads. The electric structure of the AND and OR gates is essentially identical. AND or OR characteristics of a particular gate depend on its logic function and physical cooperation with other logic elements at a particular time during the execution of a particular instruction. AND and OR gates are oftentimes serially related in order to derive a resulting logical output needed for a specific control function. Inverter gates are used in FIGS. 7 to 11 and are represented by closed crescents with an I therein. Such a gate reverses the output potentials of the inhibited and enabled states of the gate. For example, note inverter gate CSAGC of FIG. 11. In addition, a number of individual AND and OR gates in logic combinations are represented by squares with a G-designation in FIGS. 7 to 11. For example, gate G19 of FIG. 7 is a combination of 16 AND gates used for gating 16-bits from a logic register LR of FIG. 7 in response to the coincidence of a control signal from gate LRGB.

DESCRIPTION OF A PREFERRED EMBODIMENT

The organization of the principal equipment units of the illustrative embodiment of our invention will now be described with respect to FIG. 1. The electronic switching system is designed to serve many different telephone stations, such as stations TS1—TSN. These stations are connected to the switching office over the telephone lines L1–LN and are terminated in a switching network SN of the telephone office.

Network SN comprises the switching facilities which are operative under control of a call processor CP for establishing communication connections selectively between and from lines L1–LN and incoming trunks, such as trunk IT, to service circuits SC1–SCN. The latter typically include digit receivers, dial tone supplies and other functional service circuits that are utilized for serving calls. The switching facilities of network SN also serve to establish outgoing and tandem call connections from the lines L1–LN and trunk IT to outgoing trunks, such as trunk of to a distant office.

A master scanner MS is connected to service circuits SC1–SCN and the lines L1–LN via network SN as well as other functional circuits (not shown) for sensing the receipt of service requests and for general supervision over call service conditions. Communications among the scanner MS, network SN and processor CP via its input-output control circuit IO are by way of bus systems BS which provide discrete communication paths between selected ones of the circuits.

Processor CP is a common control data processing facility which is employed to implement the various telephone administrative and maintenance functions of the electronic switching system. It performs a vast amount of the logic, control, storage, supervision and translation functions required for the operations of network SN and the service circuits SC1–SCN as well as other operational circuits of the switching system. It is divided functionally into four units comprising a program store PS, call store CS, input-output control circuit IO, and a program control circuit PC.

Program store PS is a semipermanent memory facility which contains a large number of separately addressable locations, or words each having multiinformation bits. The store PS is employed to store information including system programs and subroutines of commands, or instructions, together with a variety of translation information, such as the station directory number to the corresponding line equipment location data. Translation facilities are also furnished in the program store for deriving semipermanent information for routing, charging, ringing and the like on telephone calls.

Call store CS is a temporary or destructive memory unit which employs apparatus for storing information pertaining to calls in progress, and of a rapidly changing nature that must be quickly available for interrogation and modification both by the program and IO circuit. Such information is stored in a large number of randomly addressable locations (words) and each such location contains binary bits of information. It includes: (1) the busy-idle status of communication paths through the switching network SN, (2) the digits received from a digit-receiving one of the service circuits SC1–SCN, and (3) the information pertaining to records of entry from a system program into a subroutine. The program control circuit PC and the input-output circuit IO are selectively operative to control the exchange of information with the call store CS.

The program control circuit PC is the primary information processing unit of the system. It contains a large number of registers together with the sequencing logic to provide timing and control signals for the reading, interpreting and execution of program instructions. In addition, it is capable of obtaining a sequence of many different basic instructions, or orders, and translating such instructions into signals utilized for controlling the network SN, service circuits SC1–SCN and other functional circuits of the system via the input-output control circuit IO. The instructions are written in the form of programs including subroutines which are stored in the program store PS. The program instructions are the vocabulary of the machine and are used to inform the switching circuits of the system how and when to perform their various functions. The program control PC requests a program or subroutine instruction from the program store PS every few microseconds and, upon receiving it, translates it for commanding the appropriate circuit or circuits to carry out designated functions. Accordingly, the program control PC is a hub of the system which originates substantially all addresses and commands to other circuits and receives back all answers from those circuits. It is noteworthy that the program control PC is capable only of executing individual instructions and that the mechanized intelligence needed to supply the instructions utilized for the complex telephone switching functions of the system resides entirely in the stored programs.

The input-output control circuit IO provides interfacing for the processor CP and peripheral circuits and is equipped with facilities such as a central pulse distributor, address bus drivers, scan answer bus receivers, and sequencing logic for digit receiving and sending functions. Circuit IO is the means through which input signals enter the processor CP from peripheral equipment and from which output instructions or command signals are sent to the peripheral equipment including network SN and circuits SC1–SCN. Control circuit IO has two roles. In the first, it is effectively an extension of the program control circuit PC that contains sequencing and timing logic together with registers and other circuitry utilized to execute the program instructions for directing orders to peripheral circuits. For its second role, control circuit IO is equipped with wired logic circuitry for performing a portion of the digit receiving, digit sending, scanning and data sending jobs. Such work is divided between the systems programs and circuit IO in such a manner that much of the decision making is left to the program. Communications between the stored program and the wired logic portion of circuit IO is via certain commonly shared areas of the call store CS.

In the call processing plan of the illustrative system, the programs used to process calls are broadly divided into two classes: (23) routines which are executed on a fixed periodic schedule, and (2) base level programs which do not require strictly periodic execution. Some functions performed by routine programs are (1) scanning of lines, trunks and service circuits, (2) digit receiving and sending, and (3) sending orders to the network and other peripheral units, such as service circuits. According to the illustrative arrangement, routine programs are executed sequentially on a fixed schedule. Any other program which is being executed when that scheduled period is to commence is interrupted and the routine programs are initiated. When the latter are executed, the interrupted program is resumed at the point of interruption.

The base level programs are responsible for maintaining records concerning calls in progress. These programs also effect the examination of supervisory inputs and incoming digits accumulated by the scanning and digit processing programs and the correlation of the returned information with records of calls in progress. This correlation process produces information for causing orders to be sent to the network SN and other peripheral circuits for establishing and supervising call connections.

In accordance with the present invention, an important means for obtaining coding economies in the exemplary system is achieved by the extensive use of subroutines. As is well known, a subroutine is selectively part of an interrupt program or a portion of a base level, or master system, program that causes a data processor to carry out a well-defined mathematical or logical work operation. Usually, each subroutine is used to avoid repeating the same sequence of instructions in many different places in the master program. It not only has the advantage of saving code and program store space, but it also makes program debugging simpler because a subroutine need only be debugged once. The present invention provides apparatus in the program control PC which advantageously cooperates with the call store CS to facilitate under control of the program store PS, the entry into a subroutine from a base level program, the nesting of subroutines, and the return to the base level program. It also provides for easily accessible scratch pad storage for use by subroutines. The apparatus is operative each time a new subroutine is entered from either a base level program or another subroutine to store certain data including the address for returning to the base level program or other subroutine at the correct time after the execution of the subroutine. When a new subroutine is entered, a so-called "push-down" level control in the sequencing of the base level or subroutine program is decremented by one and when a subroutine return is executed following the completion of the subroutine, the "push-down" level is incremented by one. This "push-down" feature is used in the illustrative embodiment for maintaining orderly records of return addresses and other data for a group of 16 successively executed subroutines.

CALL PROCESSOR

Figure 2:
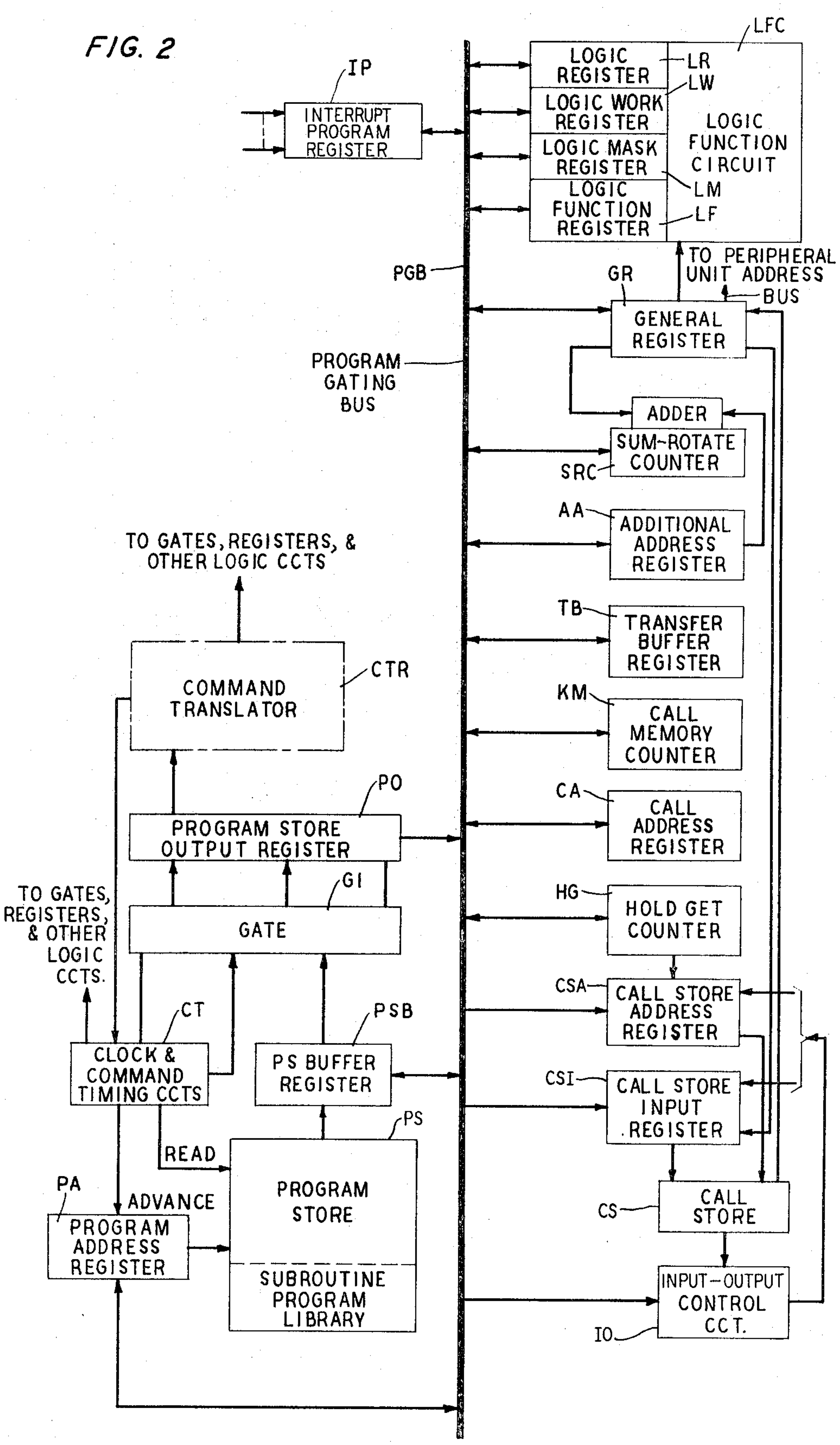
FIG. 2 shows a block diagram of a call store and program store cooperating with functional circuit blocks in a program control circuit of the illustrative switching system.

Referring now to FIG. 2, a brief explanation is presented of the structure and cooperation among the program store PS, call store CS and program control PC. The program store PS contains a large number of separately addressable locations, or words, providing the instructions or commands of the system program and subroutine library. Each such word illustratively has 22 binary bits of information. Two types of information are stored in the program store PS word locations, i.e., commands and data. The program control PC contains two registers which are associated with the operation of the program store PS, namely an 18-bit program store address register PA and a 22 -bit program store buffer PSB. Register PA specifies by its -*-bit contents the address in the program store PS from which each word is to be readout. Register PSB is the circuit into which the read outputs from the store PS are loaded.

The address in register PA is modified by various actions within the program control PC during a work operation, but remains fixed while the store PS is read. When a READ (the program store) signal is generated by the clock and command timing circuits CT, store PS is read at its location currently designated by the PA register. The output from the program store PS consists of 22 leads with signals that drive the program store buffer register PSB for temporarily storing the readout command word while a priorly readout command is being executed. Upon completion of the latter function, the stored word in register PSB is gated to the program store output register PO and register PSB is resettable for receiving the next word from the store PS.

Program store PS is normally read in sequence and, accordingly, the register PA is a counter which is incremented under control of the command timing circuit CT for the sequential operation. At times, however, it is necessary to interrupt the normal sequential addressing of store PS to make a so-called "jump" or transfer in the program. The execution of these transfer type commands is controllable by circuit IO and interrupt program register IP of the program control PC and causes the nonsequential next address to be gated into the register PA from a register IP via a program gating bus PGB. If a transfer is executed, the contents of register PSB are erased and store PS is read at the revised location.

Program control PC is equipped with numerous registers, in addition to registers PSB and PO, as well as other logic circuits, as shown in FIG. 2, to allow the manipulation of data by the program. The majority of these registers have a set of gates to allow signals appearing on the gating bus PGB to enter data into the register. A central register in the program control PC is the 16-bit general register GR. It is also a program input-output register working with the call store CS. Logic commands generated by the program utilize register GR and also the logic register LR, logic work register LW, logic function register LF, and a logic mask register LM, each of which have the capacity for 16-bit registration. A logic function circuit LFC logically combines the information in registers GR and LR on a bit-by-bit basis operation on those bits specified in register LM. A logic function being performed by circuit LFC is specified in register LF. The results of that work operation are placed into register LW or GR.

A sum rotate counter SCR is a 16-bit register which is not program accessible, but is used internally by the program control PC. It is employed, for example, in simple additions and as a buffer during rotate instructions. Counter SRC includes a full adder circuit for allowing information in register GR to be added to that of an additional address register AA for producing a sum in counter SRC which is then gated to register AA. Counter SRC is also utilized to hold the address of a next program word to be read from the program store PS while the register AA is used as a data address. The word stored in counter SRC is gated via bus PGB into the register PA following a reading of store PS and for preparing register PA for a next reading of store PS. The call processor CP advantageously contains a hold-get counter HG which, in accordance with the illustrative embodiment of this invention, is a 4-bit binary counter for counting the entry from a base level program into a maximum of 16 subroutines and automatically providing a portion of the address defining blocks of data words assignable to a subroutine. The count in register HG is advantageously used for controlling data transfers and retrievals from each of the blocks of data words as well as the control over program and subroutine operations. A transfer buffer register TB is used as an address supplement for expanding addresses in the various 16-bit registers of FIG. 2 into 18-bit addresses in the program address register PA. A combined call record counter and mode counter KM are employed in the program control PC for program counting and testing, respectively.

A call store address register CSA sequentially receives and stores 14-bit addresses of words to be read from the call store CS. The latter is a random-access destructive readout memory with a prescribed read-write cycle. Such a cycle begins with the generation of an address in register CSA. The latter address is gated to register CSA from circuit IO or via bus PGB from either register AA or a call address register CA for use as an address in reading or writing of the call store CS. For a reading operation, a read-the-call store signal is generated and it specifies the register into which the read information is to be transferred from the call store CS. For example, the data read from store CS is sent as directed to either register GR or to the input-output circuit IO. Since the reading operation of the call store CS is a destructive readout, the data must be regenerated or newly compiled each time for rewriting it into store CS. For this purpose, the input information to be written into store CS is gated from the gating bus PGB, register GR or circuit IO to the call store input register CSI. This information arrives within a prescribed time after the read signal. It is thereafter written into the store CS and then the contents of the register CSA are changed for the next word. The information which is readout of the store CS is in some cases modified and written back in the same cycle.

Figure 3:
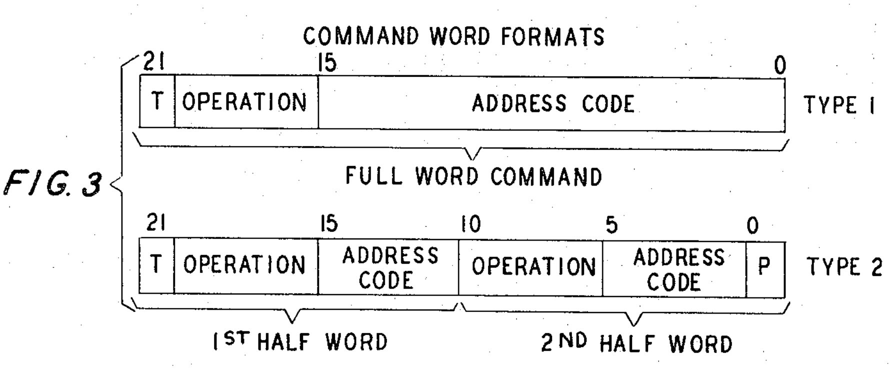
FIG. 3 depicts the component elements of instruction words illustratively used for program control of the exemplary switching system.

Program instruction, or command, words for controlling the various register and 16 work operations originate in the program store PS. Two types of command word formats are used in the program language and these include full- and half-word commands as illustrated in FIG. 3. A full-word command comprises 22 binary bits of an entire word for one command. A half-word command comprises 11 binary bits and there are two half-word commands per 22-bit word. The bits of program words are allocated as follows: Bit 21 (the leftmost bit) is the transfer bit T. It is a 1 only when the word is reached by a transfer-type instruction. For a full-word command (Type I), the remaining bits are all associated with one command. In some cases, bit O (the rightmost bit) is used as a parity bit. In the case of half-word commands (Type II), bit 21 is again a transfer bit. Bits 20 through 11 are associated with the first half-command, bits 10 through 1 are the second command, and bit 0 is always the parity bit. The first command is in the left of the program store word, and the second command is in the right of the program store word.

Each new program word, either a full-word command or two half-word commands is decoded by the command translator CTR of FIG. 2 after the word is gated from register PSB via gate G1 into register PO. Translator CTR is a logic circuit which decodes the binary representation of each command in register PO into output signals for various registers and other logic circuits which identify the specific command to be executed, such as TSA-Y, HX, TTSA and GX, discussed further below, and which control the operation and gating of information.

The clock and command timing circuits CT of FIG. 2 provide the basic timing signals used for synchronizing the execution of instructions in the various gates, registers and other logic circuits of the system. Decoded command signals are received in circuits CT from the translator CTR and are utilized by circuits CT to decide if a command is a full- or a half-word and to specify the correct number of machine cycles needed to execute the command. They also regulate the operation of register PA and the reading of the program store PS among other functions.

Figure 4:
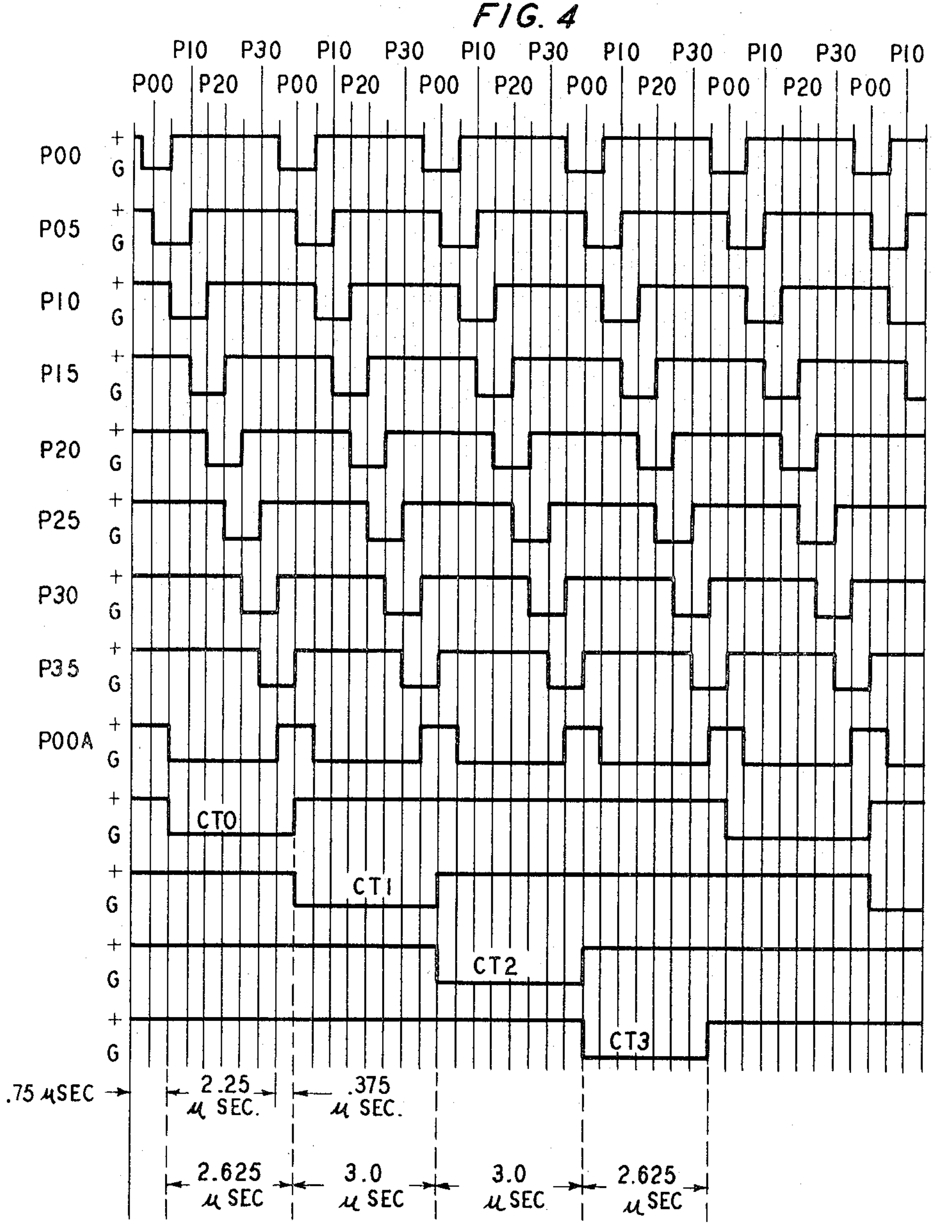
FIG. 4 is a diagram of the clock and command timing pulses utilized in the illustrative communication switching system.

The synchronized control over the execution of various commands and logic operations in the switching system is accomplished by means of basic timing signals which are generated illustratively by a 2.67 megacycle clock pulse generator portion (not shown) of the clock and command timing circuits CT of FIG. 2. These pulses are distributed to various gates, counters, registers and logic circuits of FIGS. 7 through 11 for the control operations. As shown in FIG. 4, eight overlapping clock pulse phases POO, PO5 through P30, and P35 are cyclically generated by circuits CT. Each such pulse is negative in polarity and is approximately .75 μsec in duration. The period of each pulse is 3 μsec. The ratio of pulse on to off is 1:3 and each pulse overlaps the immediately preceding pulse by a nominal 50 percent. The first pulse phase is P00, which is at ground potential G for approximately .75 μsec and thereafter is switched to positive potential for 2.25 μsec. The second pulse phase P05 is at ground potential .375 μsec after the pulse P00 switches to ground. Then, pulse P10, P15, P20, P25, P30 and P35 successively follow. To insure nonoverlap in certain logic functions, a guard space is provided between every third pulse such as pulse P15 and P30 which do not overlap.

Circuits CT also cyclically generate P00A pulses and, as illustrated in FIG. 4, each repetition of pulse P00A represents a machine cycle of the program control PC. Different commands in the system require a varying number of machine cycles to execute and for the synchronized control thereof four command timing pulses CT0–CT3 are generated by circuits CT. The first machine cycle is initiated with pulse CT0. The latter is switched to ground potential at the start of pulse P10 and stays at ground for 2.625 μsec. Each one of the pulses CT1–CT2 introduces a succeeding machine cycle for a command and is of a 3 μsec duration. Pulse CT3 is 2.625 μsec in duration and commences a last cycle in any command.

The foregoing pulses are provided for executing four commands which illustrate salient features in the exemplary embodiment of the present invention. These commands are utilized for dictating or specifying transfers between a main program and subroutines, as well as the holding, or storage, of addresses and data in the call store CS during the execution of one or more subroutines. In addition, the commands specify the retrieval of the stored addresses from the call store CS and the return to the appropriate level of the base level of the main program at the end of the subroutine operations. These commands include:

TSA Y command (transfer from main program to Y subroutine and save address of main program)

HX command (hold X register address or data in call store CS)

GX command (get X register saved address or data from call store CS)

TTSA command (transfer to saved address of main program.)

Figure 5:
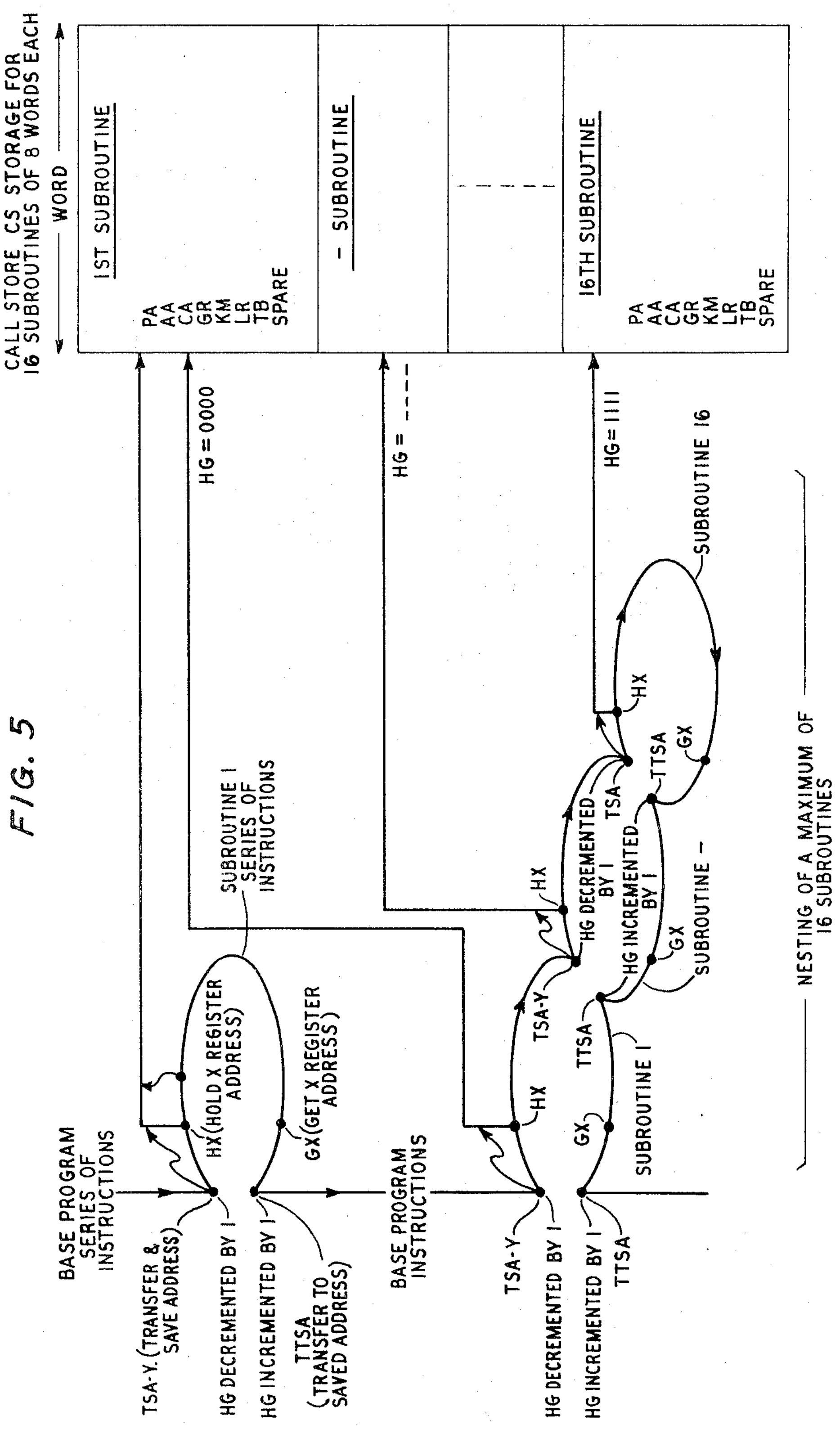
FIG. 5 is a flow chart and block diagram illustrating the relationship between command sequences and transfers of addresses and data among the program control and call store.

Before explaining these commands in further detail, it is advantageous to explain certain characteristics of a transfer from a main, or base, level program to one or more subroutines. Referring to FIG. 5, a flow chart depicts the flow operations of base level program and subroutine instructions. These instructions are sequentially received from the program store PS and illustratively commence with those of a base program and proceed to a first subroutine. A series of instructions in the base program are executed on a sequential basis toward a first transfer and save address command TSA Y where Y specifies the identity of a selectable subroutine to be executed. The address to be saved upon receipt of a TSA Y command is called a return address and is initially in register PA of FIG. 2. For the saving operation, the PA address is written into the call store CS in a first word of one of 16 blocks each of which illustratively has eight words. When a TSA Y is to be executed, certain of the registers AA, CA, GR, KM, LR and TB in program control PC contain addresses and data which are not generally utilized or changed during subroutine operations but which are thereafter used for the base level program operations. In accordance wit the present invention, this data and address information is transferred from the registers to the call store CS for temporary storage during subroutine operations and for enabling the cleared registers to be used for "scratch-pad" and other work operations on subroutine instructions. Address and data are transferred sequentially from the registers to discrete store areas of store CS under control of a series of HX commands in the subroutine where X specifies the identity of the register. For example, a typical HX command is a HAA instruction specifying the transfer and holding of the contents in the register AA in the call store CS. The holding of the register information in the store CS generally indicates that it is not used or changed during subroutine operations.

The call processor CP advantageously contains a hold-get counter HG which, as previously mentioned, is a 4 binary bit counter for 16 subroutines and which automatically indicates the subroutine being executed. When the main, or base, program is being executed, counter HG illustratively registers 0001. It is decremented by one to 0000, upon the execution of each TSA command for indicating the subroutine number of the 16 which can be executed and for which addresses and data can be nested in the store CS.

As shown in FIG. 5, a first TSA command causes the decrement of counter HG from 0001 to 0000 to indicate an entry into a first subroutine. It also causes address data for register PA to be stored in the store CS in a word designated PA in the first subroutine block. An HX command or a series of such commands may thereafter be sequentially or nonsequentially executed to effect the writing of address or data from the registers and counters AA, CA, GR, KM, LR and TB of FIG. 2 into corresponding AA, CA, GR, KM, LR and TB words of the call store CS. The remaining instructions of the subroutine are next executed for performing work operations. Upon the completion thereof, one or more GX commands are generated by the program store PS and are executed to retrieve the saved addresses and data from the call store CS and to rewrite it into the register from which it was earlier cleared. After the latter operations are completed, store PS presents a TTSA command to the buffer register PSB for execution. Command TTSA effects the adding of 1 to the HG counter and the transfer of call processor control from the subroutine to the base level program.

The exemplary embodiment of this invention is further designed to execute successively a series of up to 16 selectable subroutines and to nest program and subroutine data and addresses in call store CS. These operations are illustrated in FIG. 5 by the subroutines 1—16 which are successively executed after instructions in the base level program following the completion of the aforementioned subroutine 1. The commands TSA Y and TTSA are repeatedly used for each subroutine 1—16 to control the transfer between the base level program and a subroutine 1 and between the subroutines 1—16. In addition, these commands effect subtraction and addition for the counter HG to maintain an orderly record of the identity of the subroutines 1—16 during work operations. Command HX is used for effecting the nesting of address and data information in 16 subroutine storage blocks in the call store CS. Each of the blocks corresponds to one of the 16 subroutines and illustratively has seven words and a spare corresponding to the seven counters and registers AA through TB and a spare (not shown). The latter registers and counters are arranged for storing changeable information in binary form during each of the 16 subroutines. Each command GX effects the retrieval of nested information for a selected one of the counters and registers AA through TB from the store CS proximate to the end of each subroutine.

DETAILED DESCRIPTION

In light of the foregoing explanation of the flow chart and clock pulses for commands, a detailed description is now presented of the manner in which the commands TSA Y, HX, GX and TTSA are executed by the program control circuitry of FIGS. 7—11. The description is more clearly understood by reference to the time charts in FIG. 6 for the execution of the latter commands under control of the clock pulses P00—P35 depicted in FIG. 4.

TSA Y COMMAND

A TSA Y command is a full-word, two-cycle command. It is an unconditional transfer of system control initially from a base level program to a subroutine or subsequently from one subroutine to another. The command is transmitted initially from the program store PS of FIG. 2 to the program store buffer register PSB of FIG. 8 from where it is transferred for storage in the program store output register P0 of FIG. 8 during its translation and execution. Upon transfer of the command, the command translator CTR of FIG. 2 is activated for driving the clock and command timing circuits CT of FIG. 2. The command timing then decides the number of machine cycles used to execute a TSA Y command.

Figure 10:
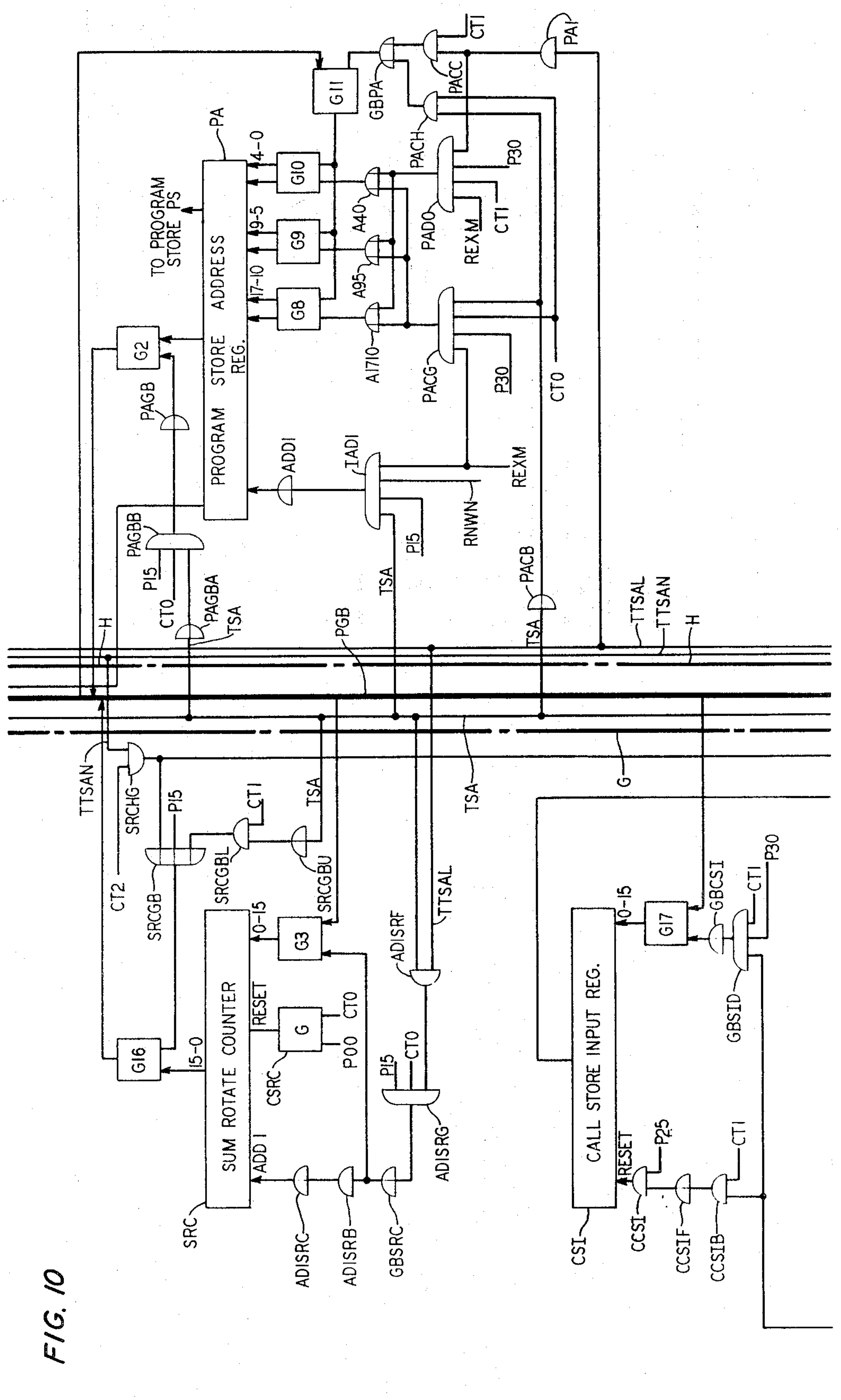

At the coincidence of a first machine cycle pulse CTO, clock pulse P00 gate CSRC of FIG. 10 is enabled for resetting (function ZSRC of FIG. 6) the sum and rotate counter SRC of FIG. 10. The resetting is effected to prepare register SRC for receiving a portion (16 bits) of an address from the program address register PA of FIG. 10. The latter address is a return address and is to be saved in the PA word of one of the aforementioned 16 storage blocks in the call store CS for implementing the return to the appropriate base level program or a prior subroutine stage after the execution of the present subroutine.

Figure 6:
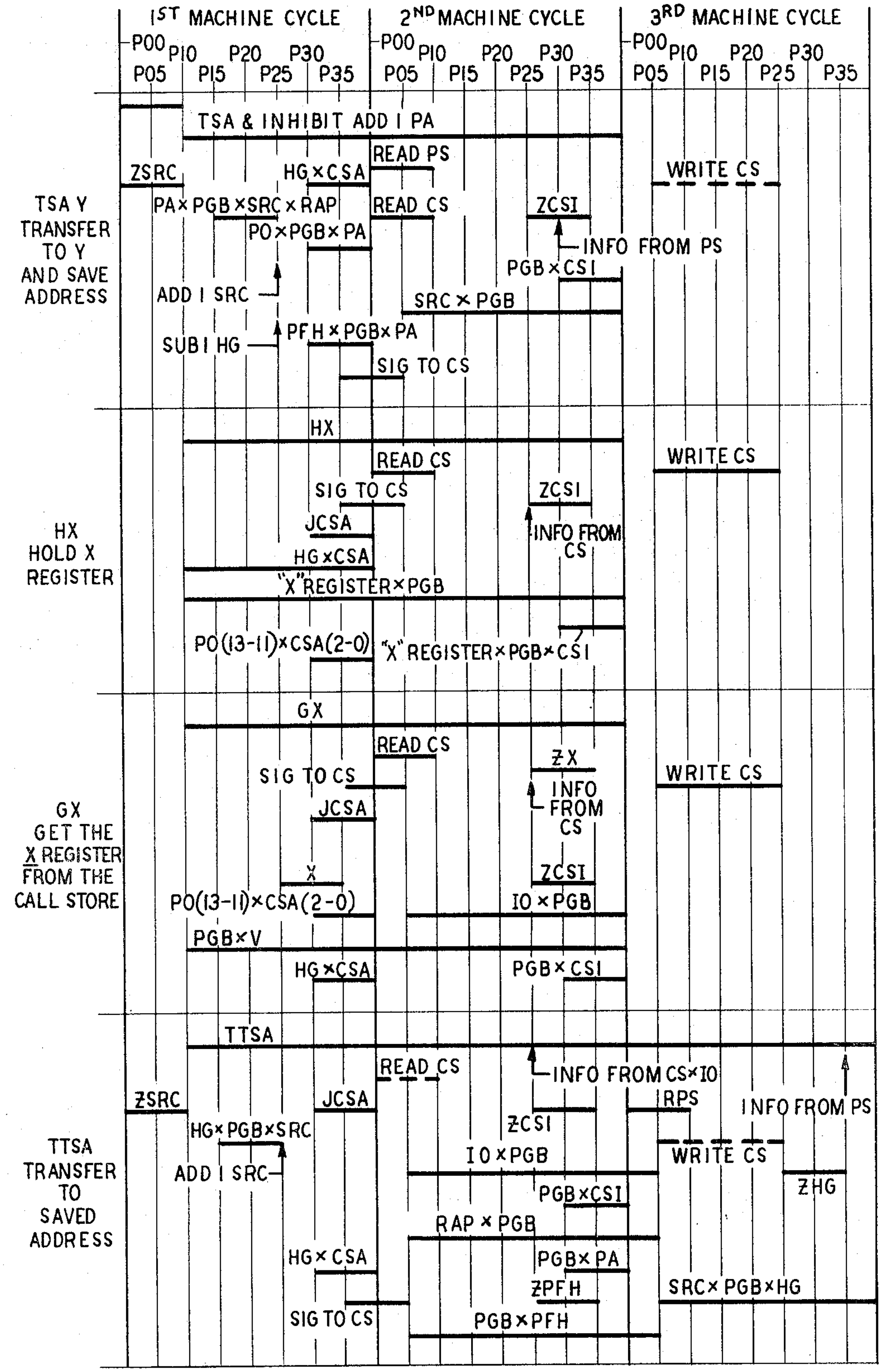
FIG. 6 is a sequence chart for the circuit operations in the program control, call store and program store for the various commands.
Figure 11:
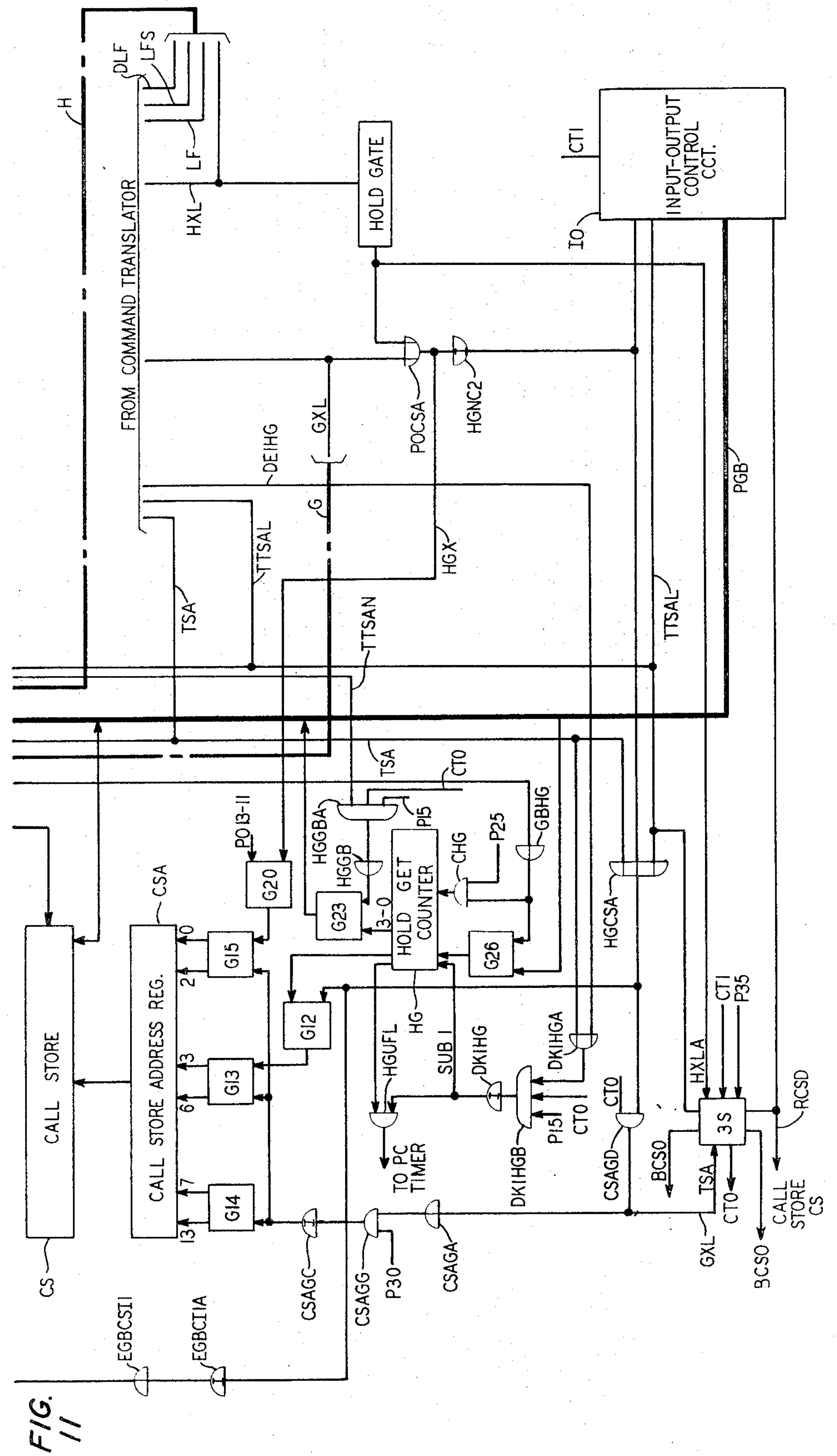

As depicted in FIG. 11, command translator CTR supplies a control signal to lead TSA during the first machine cycle of command TSA Y in response to a translation of the program instruction from register P0 of FIG. 2. The signal is supplied to lead TSA in synchronism with the start of pulse P10 as indicated in FIG. 6 for numerous control operations over circuits in FIGS. 7—11 during the remainder of command TSA Y. The signal inhibits gate IAD1 of FIG. 10 to block the add 1 feature of register PA which normally controls the advance to an address of the next word to be read from the program store PS.

Upon the receipt of clock pulse P15 during the first machine cycle of command TSA Y, the 18-bit address in register PA of FIG. 10 is shifter to the program gating bus PGB (function PA X PGB of FIG. 6) upon the enabling of gates G2, PAGB, PAGBB and PAGBA in response to the pulse signals TSA, P15 and CT0 and the output bit signals of register PA. Concurrently, bits 15-0 of the 18-bit PA ADDRESS ARE GATED INTO REGISTER SRC of FIG. 10 via its logic chain gate G3. At the same time, a 1 is added to the address in register SRC by the enabling of gate AD1SRF of FIG. 10 by signal TSA which, in cooperation with pulses CT0 and P15, drives gates AD1SRG, GBSRC and AD1SRB, as well as inverter gate AD1SRC. The enabled gate GBSRC also cooperates to drive the logic gate G3 for gating the PA register bits 0-15 from bus PGB to register SRC. In addition, the PA register bits 17 and 16 on bus PGB are gated via a logic gate G4 of FIG. 9 into the return address program (RAP) area, that is bits 7 and 6 of register TB and under control of gates PARA, PARAC and TSAN which are enabled by pulses TSA, P15 and CT0. Register TB stores these two bits until a return address is subsequently compiled. Store CS is capable only of storing 16-bits of the PA address. Next, a subtraction of 1 from hold-get counter HG of FIG. 11 is made for identifying an entry into a first subroutine. The subtraction occurs under control of gates DK1HG, DK1HGB and DK1HGA which are concurrently enabled by the pulses TSA, P15 and CT0.

Figure 8:
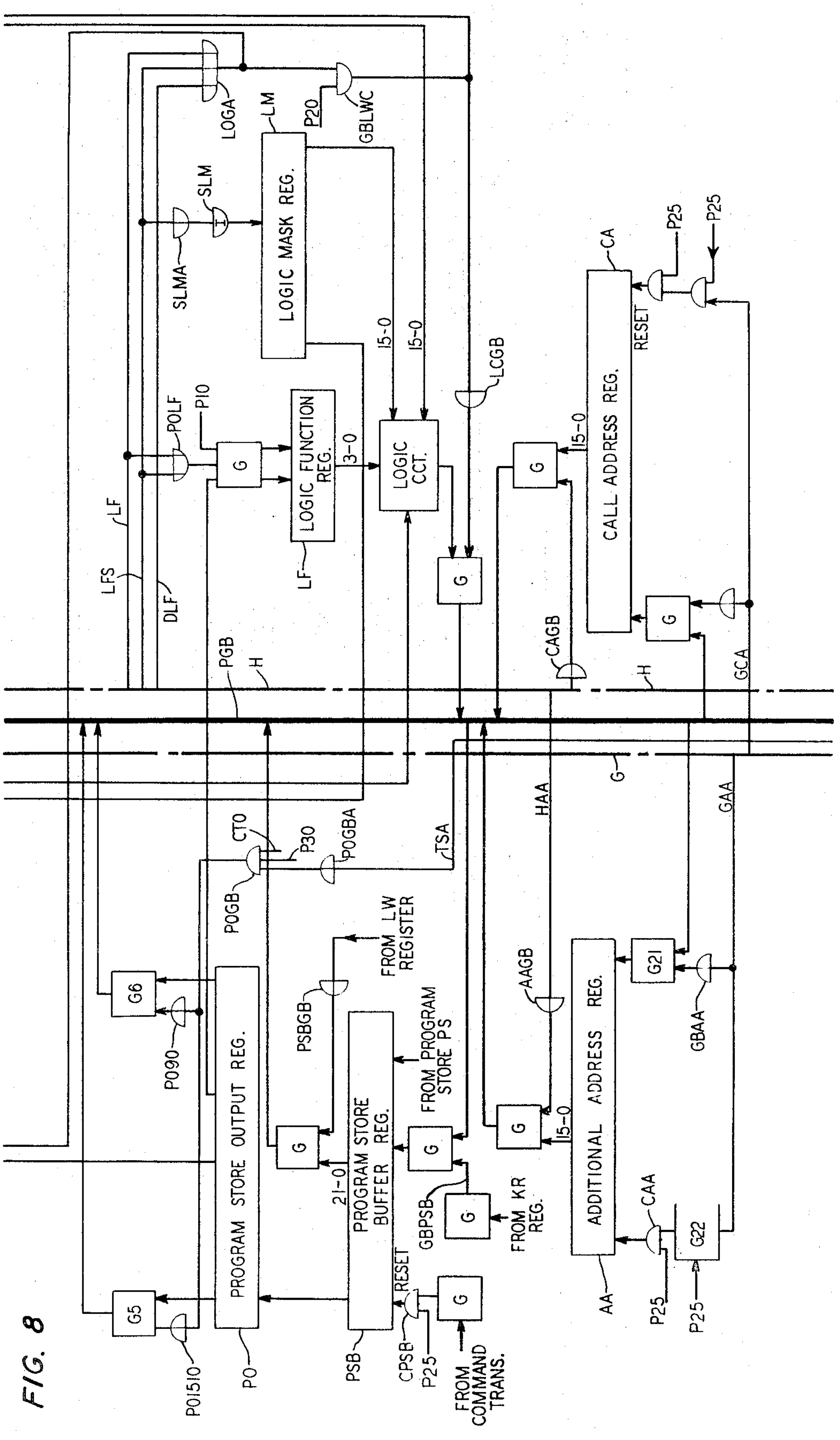
Figure 9:
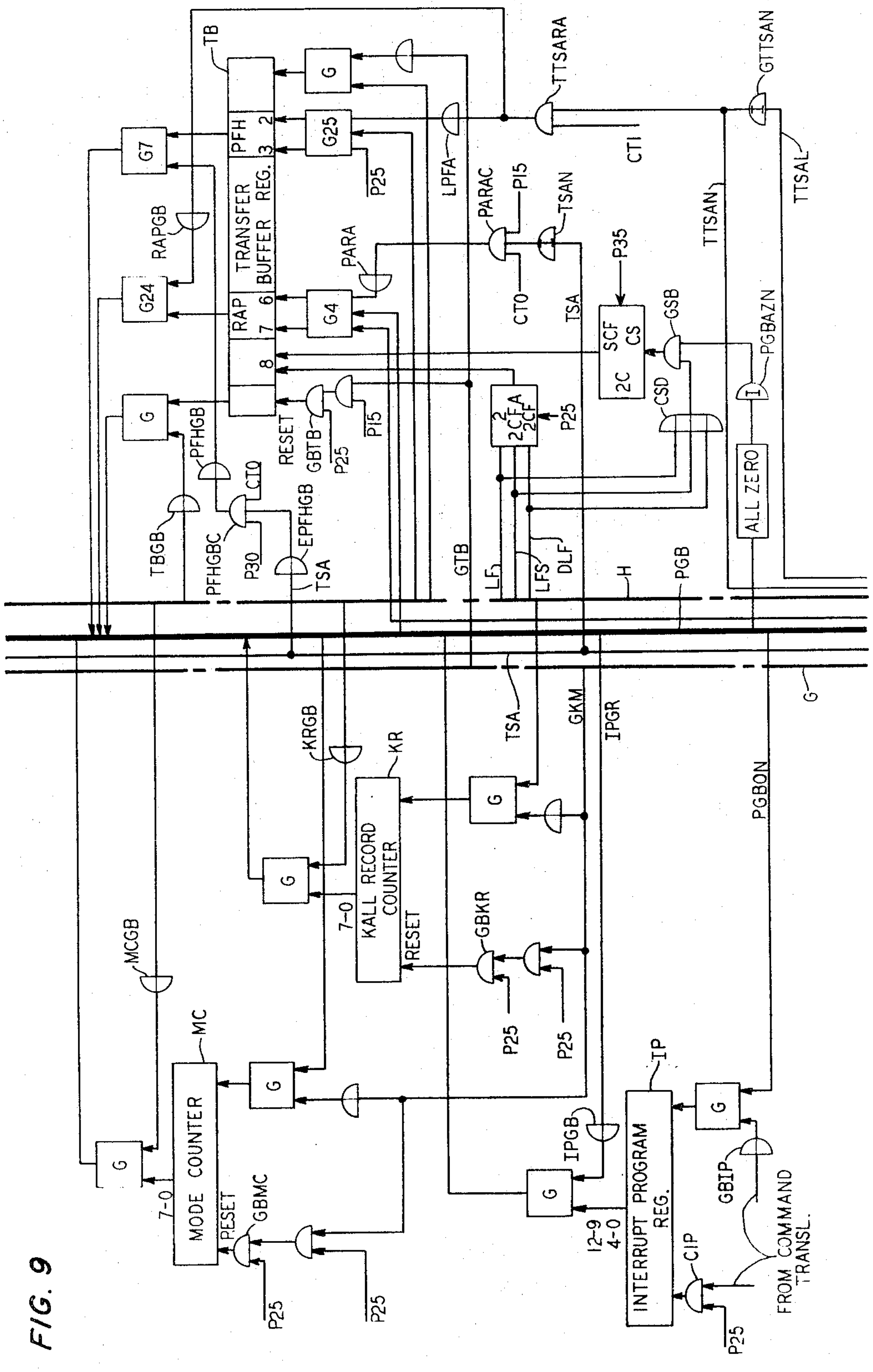

The address of the subroutine to which a transfer is to be made is next compiled and transferred from registers P0 of FIG. 8 and TB of FIG. 9 to register PA of FIG. 10. This action is accomplished by combining bits 15 through 0 of register P0 with the program high fill (PFH) bits 3 and 2 of register TB (which are preloaded into the register on a previous instruction) to construct an 18-bit address in which the PFH bits are bits 17 and 16, Bits 15–0 of register PO are gated to program gating bus PSB VIA gates G5 and G6 under control of gates PO1510 and PO90, POGB and POGBA upon the coincidence of pulses P30, CTO and TSA. Bits 3 and 2 of register TB are gated to bus PGB via gate G7 under control of gates PFHGB, PFHGBC and EPFHGB and pulses P30, CTO and TSA. From bus PGB, the 18-bit address is immediately admitted to register PA of FIG. 10 via gates G8–G11 under control of gates A1710, A95, A40, PACG, PACB, GBPA and PACH in response to pulses P30, CTO and TSA.

Concurrent wit h the storage of the subroutine address in register PA, the 4-bit count in counter HG of FIG. 11 is transferred to bits 6 through 3 of the call store address register CSA of FIG. 11 for assigning a block of data words in the call store CS and subsequently effecting a destructive readout from the call store CS of the information in a first one of eight words in an appropriate one of the 16 blocks specified by the 4-bits. The transfer is controlled by gates G12 and G13 of FIG. 11 with the latter being enabled to admit the register HG count by gates CSAGC, CSAGG, CSAGA, CSAGD and HGCSA upon the coincidence of pulses CTO, TSA and P30. Gates G14 and G15 are also enabled over the latter group of gates to reset the remaining bits of register CSA.

The 16 blocks of eight words in the call store CS, as illustrated in FIG. 5, yield a total of 128 words which are storable therein. The 4-bit count in register HG is settable during each TSA Y command to 16 different counts each of which corresponds to a unique location of one of the 16 blocks of eight words. For example, a first HG count 0000 corresponds to a first block of the 16 groups and a second count 0001 corresponds to a second block of the 16. These 4-bit counts are transferred to the register CSA area for bits 6 through 3 and the last bits 2 through 0 of register CSA are reset to zero. Accordingly, each of the settable counts in register HG is effectively multiplied by 8 in binary form in register CSA to specify uniquely the address of a first word in each of the 16 different blocks. Illustratively, the call store address for a first word of block 1 for the first subroutine as it is stored in bits 6 through 0 of register CSA is 0000000 and a first word of block 2 is specified by 0001000 in bits 6 through 0 of register CSA. Thus, the HG register count is multiplied by 8 in register CSA to specify the address of every other eighth word in the total of 128 words. As is described later, the bits 2 through 0 of register CSA are settable by the data contents of register PO during HX commands to specify the address of the other seven words in each of the blocks.

The last operation to occur in the program control PC during the first machine cycle of command TSA Y is the generation of a read-the-call store signal RCSD through enabling gate 3S of FIG. 11 in response to pulses P35, CTO and TSA (which is conveyed via gates CSAGD and HGCSA). This signal effects both the reading of the call store CS during the second machine cycle and at the address stored in register CSA and the blocking of the output of store CS from being utilized by the program control PC. This operation clears the information from the call store area which is read and enables that area to be used, as later explained, for storing the return address now in register SRC.

At the start of the second machine cycle and upon the generation of pulse P00, a read-the-program store signal is generated by the command timing circuit CT of FIG. 2 for effecting the reading of store PS at the address specified by register PA of FIG. 10. The information read out of store Ps is illustratively an HX command and it is inserted into register PSB of FIG. 8 at approximately the time that pulse P30 is subsequently generated during the second machine cycle.

Next, the 16-bits in register SRC of FIG. 10 are gated to bus PGB preparatory to its being inserted into register CSI of FIG. 10 for writing the call store CS. The gating operation occurs under control of gates G16, SRCGB, SRCGBL and SRCGBU during the coincidence of pulses CT1 and TSA. Before the data is inserted in register CSI, the latter is reset upon the occurrence of pulse P25 during the second machine cycle under control of gates CCS1, CCS1F, CCS1B, EGBCSI1, EGBCI1A and HGCSA of FIG. 11, and the pulses P25, CT1, and TSA. Thereafter, the data on bus PGB is inserted into register CSI under control of gates G17, GBCSI and GBSID and pulses CT1, TSA and P30. This data is written into the call store CS during the following machine cycle and is thereafter stored until the TTSA command is executed to return system control from the subroutine to either the base level program or a partially executed prior subroutine.

HX COMMANDS (X = AA, CA, GR, KM, LR, or TB)

This command is a half-word, 2-machine cycle instruction generated by the program store PS of FIG. 2 and shifted to the output register PO from the buffer register PSB following the execution of a TSA Y command or a prior HX command. A series of HX commands may be successively generated by the program store PS for effecting the transfer of data from registers of the program control PC to the call store CS to make the registers available for subroutine work operations. Each HX command is used for writing the contents of an individual one of the registers AA, CA, GR, KM, LR or TB into one of the aforementioned 128 word storage areas in the call store CS. The address of the appropriate storage area is compiled in the call store address register CSA of FIG. 11 and comprises:

a. bits 13 through 7 in register CSA which are reset to 0 by the HX command,
b. bits 6 through 7 in register CSA which are set with the contents of the counter HG of FIG. 11; and
c. bits 2 through 0 in register CSA which are set with the contents of the low 3 bits of the HX command, namely bits 13 through 11 in the PO register. Thus, the HG counter specifies the particular one of the 16 different 8-word blocks in the call store CS and the low three bits of the HX command in bits 2–0 of register CSA specify one of the eight words in each such block. Illustratively, each set of the CSA bits 2–0 is identified with one of the registers AA, CA, GR, KM, LR, or TB as follows:

| CSA bits 2–0 | Register |
|---|---|
| 001 | TB |
| 010 | AA |
| 011 | CA |
| 100 | GR |
| 101 | KR and MC of FIG. 9 = KM |
| 110 | LR |

After an HX command is shifted into register PO of FIG. 8, the command translator CTR of FIG. 2 is activated for translating the command and controlling the clock and command timing circuits CT of FIG. 2 which decides that two machine cycles are used in executing the command. In addition, the translator CTR applies a hold X register control signal to lead HXL of FIG. 11 during the first machine cycle upon the occurrence of clock pulse P10 and that signal thereafter persists until the end of the second machine cycle of the command as shown in FIG. 6. The HXL lead represents six different leads, each of which is associated with one of the registers TB, AA, CA, GR, KR and MC, or LR and which receives a hold X register signal from the command translator CTR when the data in the associated register is to be held.

The signal on lead HXL of FIG. 11 is conducted over cable H to the appropriate one of the registers TB, AA, CA, GR, KR and MC, or LR for enabling the data in that register to be gated to the program gating bus PGB. For example, the signal on lead HXL enables the 16 bits in the general register GR of FIG. 7 to be gated to bus PGB by enabling gates GRGB and G18 of FIG. 7 when the hold-the-X register signal is conducted over cable H to the hold register GR lead HGR. The gating of data from the other registers TB, AA, CA, KR, MC and LR is similar to that for register GR. To illustrate, the contents of register LR of FIG. 7 are selectively gated to bus PGB when a hold-the-X register signal is conducted to lead HLR for enabling gates LRGB and G19.

The control signal on lead HXL also effects the shifting of the 4 bits in counter HG of FIG. 11 to the bit 6–3 storage area of the call store address register CSA of FIG. 11. This shifting operation gathers part of the address of the word block in the call store CS corresponding to the register for which data is to be held, or stored, during the execution of the subroutine, The shifting operation to register CSA occurs by the enabling of gates G13, G12, HGCSA, HGNC2 and POCSA under control of the HX signal on lead HXL.

Upon the coincidence of pulse P30 during the first machine cycle of command HX, bits 13–11 of register PO are gated into bits 2–0 of register CSA via gates G20 and G15 for forming another part of the X register address in the call store block. Concurrently, the bits 13–7 of register CSA are reset by the enabling of gates CSAGC, CSAGG, CSAGA, CSAGD and HGCSA under control of pulses P30 and CTO and the control signal on lead HXL. As a result register CSA now contains the call store address for the register TB, AA, CA, GR, KR and MC or LR and is prepared for reading that address in the call store CS. It is advantageous to note that the registers KR and MC each store 8-bits of data and these 16 bits are usually combined for storage in area KM of each call store block during an HKM command.

The call store reading operation on an HX command is initiated upon the coincidence of pulses CTO and P35 for enabling gate 3S of FIG. 11 to produce a read-the-call-store signal RCSD. Call store CS is thereafter read upon the occurrence of pulse P00 in the second machine cycle of command HX. The reading operation, as noted previously, erases the information stored at the read address and it is therefore necessary to rewrite the address with the contents of the call store input register CSI. In the illustrative embodiment of this invention, the data rewritten in store CS is the contents of the appropriate one of the registers TB, AA, CA, GR, KR and MC, or LR associated with the HX command. To accomplish this operation, register CSI of FIG. 10 is initially reset upon the occurrence of pulse P25 during the second machine cycle by the enabling of gates CCSI, CCSIF, CCSIB, EGBCSI1, EGBCI1A, and HGCSA under control of pulses CT1 and the HX command signal on lead HXL. Next, the contents of the register to be held, for example register GR of FIG. 7, which were previously gated to the bus PGB, are gated from that bus to the register CSI upon the occurrence of pulse P30 during the second machine cycle. The gating operation is accomplished through gates G17 of FIG. 10, GBSCI, GBSID, EGBCSI1, EGBCI1A and HGCSA under control of pulses P30 and CT1 and the control signal on lead HXL. The data thus in register CSI thereafter is written into the call store CS during the following machine cycle and is thereafter stored until a GX command is executed to return the data to the appropriate one of the registers TB, AA, CA, GR, KR and MC, or TB.

GX COMMANDS (X = TB, AA, CA, GR, KM, or LR)

The program store PS of FIG. 2 generates each GX command which is a half-word, 2-machine cycle instruction. It is used to recover from the call store CS the contents of a designated one of the registers TB, AA, CA, GR, KR and MC or LR which is held in one of the 128 word storage areas of store CS as a result of a prior HX command. A series of GX commands may be successively generated by the program store PS for effecting the transfer of data from store CS to the registers TB, AA, CA, GR, KR, MC and LR. The address of any desired one of the 128 call store storage areas is selectively compiled in register CSA of FIG. 11 and comprises:

a. bits 13 through 7 in register CSA which are reset to 0 by the GX command,
b. bits 6 through 3 in register CSA which are set with the contents of counter HG of FIG. 11, and c. bits 2 through 0 in register CSA which are set with the contents of the low three bits of the GX command, namely bits 13 through 11 of register PO.

A GX command is shifted from the store PS into register PSB of FIG. 8 and then to register PO for activating command translator CTR for translating the command and controlling the clock and command timing circuits CT to decide that two machine cycles are used in executing the command. Translator CTR applies a get X register control signal to lead GXL of FIG. 11 during the first machine cycle upon the occurrence of clock pulse P10 as shown in FIG. 6 and that signal thereafter persists until the end of the second machine cycle. The GXL lead represents six different leads, each of which is associated with one of the registers TB, AA, CA, GR, KR and MC or LR and which receives a get X register signal from the command translator CTR when data is to be retrieved from the associated register from the call store CS.

The signal on lead GXL is conducted over cable G to the appropriate one of the registers TB, AA, CA, KR and MC, or LR for partially enabling input gates for subsequently shifting information from the program gating bus PGB to that register. For example, the signal on lead GXL (representing lead GAA of FIG. 8) enables gate GBAA of FIG. 8 for, in turn, partially enabling gate G21 to admit 16 bits from bus PGB to register AA when they are read out of the call store CS.

Upon the occurrence of clock pulse P25, the registers TB, AA, CA, GR, KR and MC, or LR are reset. To illustrate, register AA OF FIG. 8 is reset by enabling gates CAA and G22 under control of pulses P25 and the control signal received on lead GAA. Next the address of the register, for example register AA, to receive data from store CS is shifted to register CSA. Bits 13–7 of register CSA of FIG. 11 are reset to 0 by the enabling of gates G14, CSAGC, CSAGG, CSAGA, CSAGD, HGCSA and HGNC2 under control of pulses P30 and CTO together with the control signal on lead GXL. Concurrently, the contents of counter HG of FIG. 11 are gated into bits 6–3 of register CSA via gates G13 and G12 under control of enabled gates CSAGC and HGCSA. In addition, bits 13–11 of register PO are gated into bits 2–0 of register CSA via gates G15 and G20 in response to the enabled gate CSAGC and to the GXL control signal passed to lead HGX via enabled gate POCSA.

An RCSD signal to read-the-call-store CS at the location specified by the address in register CSA is generated by gate 3S of FIG. 11 upon the coincidence of pulses P35 and CTO and the control signal from lead GXL which is applied to gate 3S via gates CSAGD, HGCSA and HGNC2. Subsequently, the store CS initiates the reading process at the beginning of the second machine cycle of the command upon the occurrence of pulse POO. The read data is transferred from store CS to the input-output control circuit IO of FIG. 11 before the generation of pulse P25. Next, the latter pulse resets both the CSI register of FIG. 10 and the appropriate registers TB, AA, CA, GR, KR and MC, or LR. Register CSI is reset, as previously described, by the enabled gates CCSI, CCSIF and CCSIB of FIG. 10 under control of pulses CT1 and P25 together with the control signal on lead GXL which enables gate EGBCSI1 of FIG. 11. The register, for example register AA of FIG. 8, to receive the read data from store CS is reset by the enabling of gate CAA and G22 under control of pulse P25 and the control signal on lead GAA.

The data is shifted from the input-output control circuit IO of FIG. 11 via the gating bus PGB to the register CSA and the registers TB, AA, CA, GR, KM and MC, or LR upon the occurrence of clock pulse P30. On the following machine cycle, the data in register CSI is written into the call store CS at the address specified by the register CSA as indicated in FIG. 6. Illustratively, register AA receives the data from bus PGB via the previously enabled gate G21.

TTSA COMMAND

This command is used for retrieving a return address from the first word of any one of the sixteen blocks in the call store CS reserved for the subject subroutine operations. The return address orients the program control PC for operating on the next instruction which is to follow the completion of the present subroutine execution. Program control PC utilizes 18-bit addresses for reading commands or instructions from the program store PS. A 16-bit portion of such an address is stored in the first word of each of the aforementioned 16 word blocks and is retrieved by the TTSA command for insertion in the first 16-bits of the register PA. The remaining two bits are stored, as previously described, in the return address program (RAP) bits of the transfer buffer register TB and are retrieved by command TTSA for use by register PA in addressing the program store PS.

Command TTSA is a half-word, 3-machine cycle command as illustrated in FIG. 6. It is used to return control from a subroutine to an immediately prior subroutine or a base program address. The command is initiated, as shown in FIG. 6, with the resetting of register SRC of FIG. 10 in response to pulses POO and CTO. Upon the subsequent occurrence of clock pulse P10, command translator CTR identifies the command by applying a control signal to lead TTSAL of FIG. 11 for the remainder of the three cycles to control the execution of command TTSA.

Next, the program control PC compiles in register CSA the call store address storing the desired return address. Counter HG of FIG. 11 supplies the identity of the word block by having its contents gated into register CSA bits 6–3 upon the occurrence of pulses P30 and CTO. The gating occurs through gates G12 and G13 under control of gate HGCSA and gates CSAGC, CSAGG, CSAGA and CSAGD which are enabled by pulses P30 and CTO and the control signal on lead TTSAL. The enabling of gate CSAGC also effects the jamming, or resetting, to 0 of bits 13–7 and 2–0 in register CSA by enabling gates G14 and G15.

Prior to the entry of counter HG bits into register CSA, the contents of counter HG are gated via bus PGB into register SRC and are incremented therein by 1. These operations occur during the first machine cycle at clock pulses P15 and P25, respectively. The bit data is thereafter held by register SRC until it is returned to counter HG during the third machine cycle just prior to the completed execution of the subroutine. Specifically, the contents of counter HG are conducted to bus PGB via gate G23 of FIG. 11 under control of gates HGGB and HGGBA which are enabled by pulses P15 and CTO and the signal on lead TTSAL via lead TTSAN and gate GTTSAN of FIG. 9. From bus PGB, the HB bits 3–0 are admitted to register SRC of FIG. 10 via gates G3 under control of gates GBSRC, AD1SRG and AD1SRF which are enabled by pulses P15 and CTO and the signal on lead TTSAL. The enabling of gate AD1SRB, in turn, enables gate AD1SRC for adding 1 to the count in register SRC.

Upon the occurrence of pulse P35 of the first cycle, an RCSD read-the-call-store signal is sent to the store CS by enabling gate 3S of FIG. 11 under control of pulses CTO and P35 and the signal on lead TTSAL. The store CS is read at the beginning of the second machine cycle of command TTSA and at the address specified by register CSA. The latter address corresponds to the store location of the return address to be ultimately returned from one of the sixteen word blocks to register PA of FIG. 10 as part of the return of control from the subroutine in execution to the base program or an immediately prior partially executed subroutine. The read address is sent from the store CS to the input-output control circuit IO before the occurrence of clock pulse P25 as shown in FIG. 6. Prior to that time at pulse PO5 of the second cycle, the control circuit IO of FIG. 11 is coupled to the program gating bus PGB for receiving the read address to be connected thereto by store CS.

In addition, RAP bits 7 and 6 stored in register TB are gated to bus PGB in response to pulses CT1 and the signal on lead TTSAL which enable gates G24 of FIG. 9, RAPGB, TTSARA and GTTSAN. These bits are then gated to the PFH bits 3 and 2 of register TB via gates G25, LPFA, TTSARA and GTTSAN in cooperation with pulse CT1 and the signal on lead TTSAN. During a short interval of the latter gating operation, the PFH bits of register TB are reset to O via gate G25 upon the occurrence of pulse P25 as shown in FIG. 6 for the TTSA command.

The occurrence of pulse P25 during the second machine cycle also effects the resetting of register CSI of FIG. 10 over a previously described path prior to its receipt of address data from bus PGB. Registers CSI and PA both receive the address data from the input-output control circuit IO via bus PGB in coincidence with clock pulse P30. The address is admitted to register CSI via gate G17 which is enabled by gates GBCSI and GBSID in response to pulses CT1 and P30 and the signal on lead TTSAL. Register PA receives the address via gates G11 and G8—10 which are enabled by gates GBPA, PACC and PA1 in response to pulses CT1 and P30 and the control signal on lead TTSAL. The address thus stored in register PA represents the program store address which was stored therein prior to the entry from a prior subroutine or the base program to the subroutine being executed. It is used for reading the program store PS at clock pulse POO of the third machine cycle of command TTSA. The data from store PS is later received in register PSB OF FIG. 8 prior to the receipt of pulse P35 of the third cycle. It represents the command which was in register PSB at the entry to a subroutine being executed.

Next, the address data in the contents of register CSI is used for regenerating, or rewriting, the return address into the call store CS. Concurrently, the count stored in register SRC (HG incremented by 1) is transferred via bus PGB to the hold-get counter HG during the entire third machine cycle starting with pulse PO5 thereof and for advancing the base program sequential push-down procedure. During the interval of pulses P25 to P35, counter HG is cleared, or reset via gates CHG, GBHG and SRCHG under control of pulse P25 and the signal on lead TTSAN for receiving the SRC data from bus PGB. The data from register SRC of FIG. 10 is transferred to bus PGB via gate G16 under control gate SRCGB and SRCHG in response to pulse CT2 and the signal on lead TTSAN. Counter HG of FIG. 11 concurrently receives the SRC data from bus PGB via gate G26 under control of gate GBHG. This completes the command and returns the program control circuitry to the next stage in either the prior subroutine or the base level program execution to follow the presently executed subroutine.

It is to be understood that the hereinbefore described arrangements are illustrative of the application of the principles of our invention. In light of this teaching, it is apparent that numerous other arrangements may be devised by those skilled in the art without departing from the spirit and scope of the invention.

We claim:

1. In a communication switching system having a switching network for establishing communications connections for a plurality of communication lines:
- a program controlled data processor operable for controlling said network in the establishment of said connections and comprising program store means storing program commands for controlling the operations of said processor;
- memory means for storing data pertaining to said connections and including a plurality of blocks of data locations, each of said blocks being selectively assignable for storing data;
- program control means including a counter responsive to the receipt of commands from said program store means for selectively defining each of said blocks of data locations;
- means cooperating with said counter and prescribed ones of said commands for addressing each of said data locations in each of said blocks;
- means responsive to the receipt of said prescribed commands for transferring data from said program control means to each addressed data location for storage; and
- means responsive to the receipt of a predetermined one of said commands and cooperating with said counter for controlling said memory means to return stored data in said data locations to said program control means.

2. In a communication switching system according to claim 1, the combination wherein:
- said program store means stores commands for a main program and a plurality of subroutines;
- said counter includes means responsive to the receipt of one of said main program commands from said program store means for selectively defining and one of said blocks of data locations to store data therein upon an interruption in an execution of said main program commands to execute commands of a selectable one of said subroutines; and
- said transferring means includes control means cooperating with said counter and responsive to commands of said one subroutine for transferring data from said program control means to individual data locations of said one defined block for storage.

3. In a communication switching system according to claim 2, the combination wherein:
- said control means includes means subsequently responsive to the receipt of a prescribed one of said subroutine commands from said program store means for operating said counter to define another one of said blocks of data locations upon an interruption in the execution of said commands for said one of said subroutines to execute commands of another one of said subroutines; and
- said transferring means includes means further responsive to commands of said other one of said subroutines for transferring data from said program control means to individual data locations of said defined other one of said blocks for storage.

4. In a communication switching system according to claim 3, the combination; further comprising means controlled by said counter and responsive to said one main program command and said prescribed one of said subroutine commands for transferring return address data from said program control means to said one block for said respective main program and to said other one of said blocks for said selectable one of said subroutines.

5. A telephone system comprising a switching network for establishing call connections for a plurality of telephone lines:
- a program controlled call processor operable for controlling said network in the establishment of said connections and comprising program store means storing instructions of a main program and a plurality of subroutines for controlling the operation of said processor;
- call memory means for storing call data and including a plurality of blocks of data locations, each of said blocks being selectively assignable for storing data upon the interruption in the execution of main program instructions or instructions of one of said subroutines;
- program control means including a counter supplying identification data for said blocks and being responsive to a receipt of a prescribed one of said instructions in a main program or subroutine for assigning one of said blocks of data locations for storing data in said program control means;
- means responsive to a receipt of said counter supplied identification data and to instructions of said subroutines for addressing each of said data locations in said assigned one of said blocks;
- means responsive to the assignment of said one of said blocks of data locations and to the addressing of said data locations for transferring data thereto from said program control means; and
- means operative upon the execution of instructions for another one of said subroutines for selectively returning stored data from said assigned one of said blocks of data locations to said program control means for resuming an execution of said main program or said one subroutine.

6. A telephone system in accordance with claim 5 wherein:

said program control means further comprises a plurality of registers and counter devices for selectively receiving program instructions of said main program and subroutines from said program store means in the processing of said last-mentioned instructions to control said network in the establishment of said call connection;

said counter having a plurality of count states each of which supplies identification data for an individual one of said blocks;

means responsive to the receipt of said prescribed one of said instructions in said main program and said subroutine for changing a count state of said counter to assigning a predetermined one of said blocks of data locations to an individual one of said subroutines; and said transferring means being responsive to said assignment of said predetermined one of said blocks and instructions of said individual one of said subroutines for transferring data thereto from selected ones of said register and counter devices.

7. A telephone system in accordance with claim 6 wherein said addressing means includes:

first means controlled by said counter and responsive to the receipt of said prescribed one of said instructions for selectively addressing a first data location in said predetermined one of said blocks of data locations to effect a storage of return address data of an interrupted main program or subroutine and which data is received from one of said devices; and second means controlled by said counter and selectively responsive to a prescribed second one of said instructions for selectively addressing a second data location in said predetermined one of said blocks of data locations to effect a storage of data received from other of said devices in the execution of instructions of said other subroutine.

8. A telephone system in accordance with claim 7 wherein said counter includes:

a binary counter for selectively defining each address of each of said blocks of data locations;

said first and second addressing means includes a call memory address register for registering the address of each data location in each of said blocks of data locations; and means including said register and counter devices selectively responsive to the receipt of said prescribed one and second one of said instructions for cooperating with said binary counter to compile said address of each of said data locations in said address register with said defined block address and said addressed data locations supplied by each of said last-mentioned instructions.

9. A telephone system in accordance with claim 8 wherein:

said transferring means includes means responsive to the registration of an address in said call memory address register for extracting data from said addressed data location; and means for subsequently inserting data from any selectable one of said register and counter devices into said call memory address register.

10. A telephone system in accordance with claim 8 wherein:

said returning means includes means responsive to each selected one of said instructions of said other one of said subroutines for registering another data location address in said call memory address register;

means responsive to said last-mentioned registration for returning stored data from said last-mentioned data location to a one of said register and counter devices as specified by said last-mentioned instruction; and means including said address register responsive to another selected one of said instructions for transferring return address data from a prescribed first data location of said predetermined one of said blocks of data locations.

11. A program controlled telephone system having a call processor comprising:

program store means storing instructions of a main program and a plurality of subroutines for controlling the operation of said processor;

call store means for storing call data and including a plurality of blocks of data locations, each of said blocks being assignable to any one of said subroutines for storing data during the execution of instructions of said one subroutine;

program control means responsive to an interruption of said main program for executing instructions for a series of said subroutines and including a counter having count states for successively assigning each of said blocks of data locations for storing data in said program store and individually for each successive one of said subroutines in said series;

means controlled by said counter and responsive to a first prescribed instruction of said main program and each of said series of subroutines for transferring return address data from said control circuit to a first data location of said block of data locations assigned to successive subroutines in said series;

said transferring means being further controlled by said counter and responsive to the receipt of a second prescribed instruction of said subroutines in said series for transferring other data from said control circuit to another data location of said block of data locations assigned to said successive subroutines in said series; and means cooperating with said counter and responsive to other prescribed instructions of said subroutines in said series for returning return address and other data from said data locations of said assigned blocks.

12. In a data processor system having:

a central processor for executing program instructions and including a plurality of elements for storing data in an execution of said instructions;

memory means having a plurality of blocks of data locations for storing data; and means for transferring stored data from said elements to any of said blocks of data locations;

wherein the improvement comprises:

counter means cooperating with said transferring means for defining each of said blocks of data locations in said memory means;

means activated by ones of said instructions for controlling a transfer of data from said elements to a block of said data locations defined by a count state of said counter means; and means operative for controlling the count state of said counter means for each transfer of stored data from said elements to a defined one of said blocks of data locations.

13. In a data processing system in accordance with claim 12, the improvement further comprising:

means responsive to a receipt of a prescribed one of said instructions for specifying a transfer of stored data from one of said elements to any one of a plurality of said data locations; and means controlled by said counter means and cooperating with said specifying means for controlling the transfer of stored data from said one of said elements only to one of said data locations in said defined one of said blocks.

14. In a data processing system in accordance with claim 12, wherein said count state controlling means includes:

means operative for decrementing the count state of said counter means prior to each transfer of stored data from said elements and to define a predetermined one of said blocks;

further comprising means including said transfer controlling means activated by a prescribed one of said instructions and said counter means for controlling the return of data to said one element from said one data location in said defined one of said blocks; and means subsequently responsive to another prescribed one of said instructions for incrementing said count state of said counter means to define another predetermined one of said blocks.

15. In a data processor system according to claim 12 wherein said central processor includes means responsive to a prescribed one of said instructions for supplying an address to data locations in each of said blocks; and the improvement further comprises means cooperating with said counter means and responsive to the supplied address for defining only one of said data locations in said blocks.

16. A data processor comprising:

a central processor for executing a first set of program instructions and second sets of program instructions, said processor including a plurality of elements for storing data for an execution of said sets of instructions;

memory means having a plurality of blocks of data locations for storing data, a counter operable to a plurality of count states for defining each of said blocks of data locations;

means responsive to an interruption in an execution of said first set of instructions on an entry into an execution by said processor of one of said second sets of instructions for controlling a transfer of stored data from ones of said elements to one of said blocks of data locations defined by one of said count states of said counter; and control means responsive to said interruption for controlling an operation of said counter to define said one of said blocks of data locations.

12. A data processor in accordance with claim 16 wherein:

said control means includes means responsive to a receipt of a prescribed one of said instructions for decrementing said counter to define a count state corresponding to an individual one of said blocks of data locations; and means cooperating with said counter and subsequently responsive to each receipt of a predetermined instruction in said one of said second sets of instructions for controlling said transfer means to effect a transfer of stored data from an individual one of said elements to a corresponding individual one of said data locations in said defined individual one of said blocks.

18. A data processor in accordance with claim 16 wherein:

each of said data locations in each of said blocks comprises an address including first signals identifying an individual one of said blocks and second signals identifying each said data location in said individual one of said blocks;

said transfer controlling means includes means responsive to a first one of said instructions for decrementing said counter to define said first signals identifying a predetermined one of said blocks;

means responsive to a receipt of a second one of said instructions for supplying said second signals identifying an individual one of said data locations in said predetermined one of said blocks; and means jointly responsive to a receipt of the supplied first and second signals and to said second one of said instructions for controlling a transfer of stored data from a prescribed one of said elements to said individual one of said data locations in said predetermined one of said blocks.

19. A data processor in accordance with claim 18 wherein said transfer controlling means further includes means subsequently responsive to a third one of said instructions for supplying second signals identifying a prescribed one of said data locations in said predetermined one of said blocks, and means jointly responsive to said supplied first and second signals and to said third one of said instructions for controlling a return of data from said prescribed one of said data locations to one of said elements.

20. A data processor in accordance with claim 19 wherein said transfer controlling means further includes means subsequently responsive to a fourth one of said instructions for supplying second signals identifying another prescribed one of said data locations in said predetermined one of said blocks, means jointly responsive to said supplied first and second signals and said fourth one of said instructions for controlling a return of data from said prescribed other one of said data locations to a predetermined one of said elements, and means subsequently responsive to said fourth one of said instructions for incrementing said counter to define first signals identifying another one of said blocks of data locations.

PO-1050
(5/69)

UNITED STATES PATENT OFFICE
CERTIFICATE OF CORRECTION

Patent No. 3,568,158 Dated March 2, 1971

Inventor(s) Neil M. Haller, Frank S. Vigilante

It is certified that error appears in the above-identified patent and that said Letters Patent are hereby corrected as shown below:

Column 21, line 28, "claim 12" should be read --claim 17--

Signed and sealed this 22nd day of June 1971.

(SEAL)
Attest:

EDWARD M.FLETCHER,JR.
Attesting Officer

WILLIAM E. SCHUYLER,
Commissioner of Pater